US008270188B1

(12) United States Patent
Kim

(10) Patent No.: US 8,270,188 B1
(45) Date of Patent: Sep. 18, 2012

(54) APPARATUS AND METHODOLOGY FOR GENERATING AN AUXILIARY LOW POWER OUTPUT BY USING THREE-PHASE INPUT POWER

(75) Inventor: Sangsun Kim, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/251,809

(22) Filed: Oct. 3, 2011

(51) Int. Cl.
*H02M 1/12* (2006.01)
(52) U.S. Cl. .............. 363/44; 363/87; 307/13; 307/15
(58) Field of Classification Search .............. 363/35, 363/39, 44–48, 87, 88; 307/13, 15, 74
See application file for complete search history.

(56) References Cited

U.S. PATENT DOCUMENTS

| | | | | |
|---|---|---|---|---|
| 4,437,134 A * | 3/1984 | Dupraz | .......................... | 361/56 |
| 6,031,739 A * | 2/2000 | He et al. | .......................... | 363/44 |
| 6,781,802 B2 * | 8/2004 | Kato et al. | ...................... | 361/22 |
| 7,808,219 B2 * | 10/2010 | Ye et al. | ...................... | 323/224 |
| 7,944,326 B2 * | 5/2011 | Tucker | .......................... | 333/181 |
| 2002/0075702 A1 * | 6/2002 | Igarashi et al. | ................. | 363/35 |

OTHER PUBLICATIONS

Johann W. Kolar, Franz C. Zach, A Novel Three-Phase Interface Minimizing Line Current Harmonics of High-Power Telecommunications Rectifier Modules, Technical UNiversity Vienna, Power Electronics Section 359.5, 8 pages, (no. month, 1994).
Sangsun Kim, Prasad N. Enjeti, Three-Phase Active Harmonic Rectifier (AHR) to Improve Utility Input Current THD in Telecommunication Power Distribution System, IEEE Transactions on Industry Applications, vol. 39, No. 5, Sep./Oct. 2003, 8 pages.
Schaffner, High-Attenuation Filter, 2 pages.

* cited by examiner

*Primary Examiner* — Jessica Han
(74) *Attorney, Agent, or Firm* — Turocy & Watson, LLP

(57) ABSTRACT

Systems and methods for efficient three-phase auxiliary power supply for low power applications are disclosed herein. The system includes a capacitor divider circuit that can leverage electromagnetic interference (EMI) filter capacitors utilized in a main power converter. Further, three low voltage capacitors, connected in a star configuration (for a three-phase four-wire input) or a delta connection (for a three-phase three-wire input), can be utilized in the capacitor divider circuit. Additionally or alternatively, multiple high voltage capacitors can be paralleled. The capacitor divider circuit generates a low voltage alternate current (AC) signal that can be converted to a corresponding low voltage direct current (DC) signal by employing a rectifier circuit. Due to the three-phase input, the output DC signal has a very low output ripple voltage.

20 Claims, 10 Drawing Sheets

APPARATUS AND METHODOLOGY FOR GENERATING AN AUXILIARY LOW POWER OUTPUT BY USING THREE-PHASE INPUT POWER

TECHNICAL FIELD

The subject disclosure relates to three-phase power supplies and, more particularly, to an inexpensive mechanism for generation of a low power auxiliary output by using a three-phase input power.

BACKGROUND

Three-phase power supplies are utilized for various high-power applications, including, but not limited to, industrial and/or communication systems. Three-phase power is a common form of electrical power and a popular method of electric power transmission and distribution. This is mainly due to its inherent benefits for high power transmission and its smooth wave form quality which allow three-phase electrical equipment to run smoothly and last longer. A three-phase system is generally more economical than others because it uses less conductor material to transmit electric power than an equivalent single-phase or two-phase system operating at the same voltage.

Typically, a high voltage flyback converter can be utilized for alternate current (AC) to direct current (DC) or DC to DC power conversion. Specifically, the flyback converter provides galvanic isolation between the input and any outputs. In general, the flyback converter can include a buck-boost converter with an inductor split to form a transformer, such that voltage ratios are multiplied with an additional advantage of isolation. However, the design of the high voltage flyback converter limits the efficiency, reliability, and power density of the converter and can complicate control of the converter. For example, in a discontinuous mode, high root mean square (RMS) and peak currents are observed in the design, and high flux excursions are detected in the inductor. In another example, in a continuous mode, a voltage feedback loop requires a lower bandwidth due to a right hand plane zero in the response of the converter, and a current feedback loop used in current mode control needs slope compensation in cases where the duty cycle is above fifty percent. Accordingly, the design of a three-phase auxiliary power supply is not trivial and typically includes expensive components. In addition, a three-phase main power supply unit provides very high DC voltage which exceeds a 400 Volt (V) DC limit the high voltage flyback converter can support.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein relate to an auxiliary power supply, comprising a three-phase power source configured to provide three alternating current (AC) power signals and a capacitor divider circuit, coupled to the three-phase power source, configured to generate three disparate AC power signals. Specifically, the amplitude of the three AC power signals is higher than an amplitude of the three disparate AC power signals. According to another embodiment, a method is provided for receiving a first three-phase AC power waveform and generating a second three-phase AC power waveform having a smaller amplitude than the first three-phase AC power waveform by employing a capacitor divider. In yet another embodiment, a system is provided, which includes a capacitor divider that decreases voltage of three-phase AC signals and a rectifier that generates a direct current (DC) output signal based on conversion of an output of the capacitor divider.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
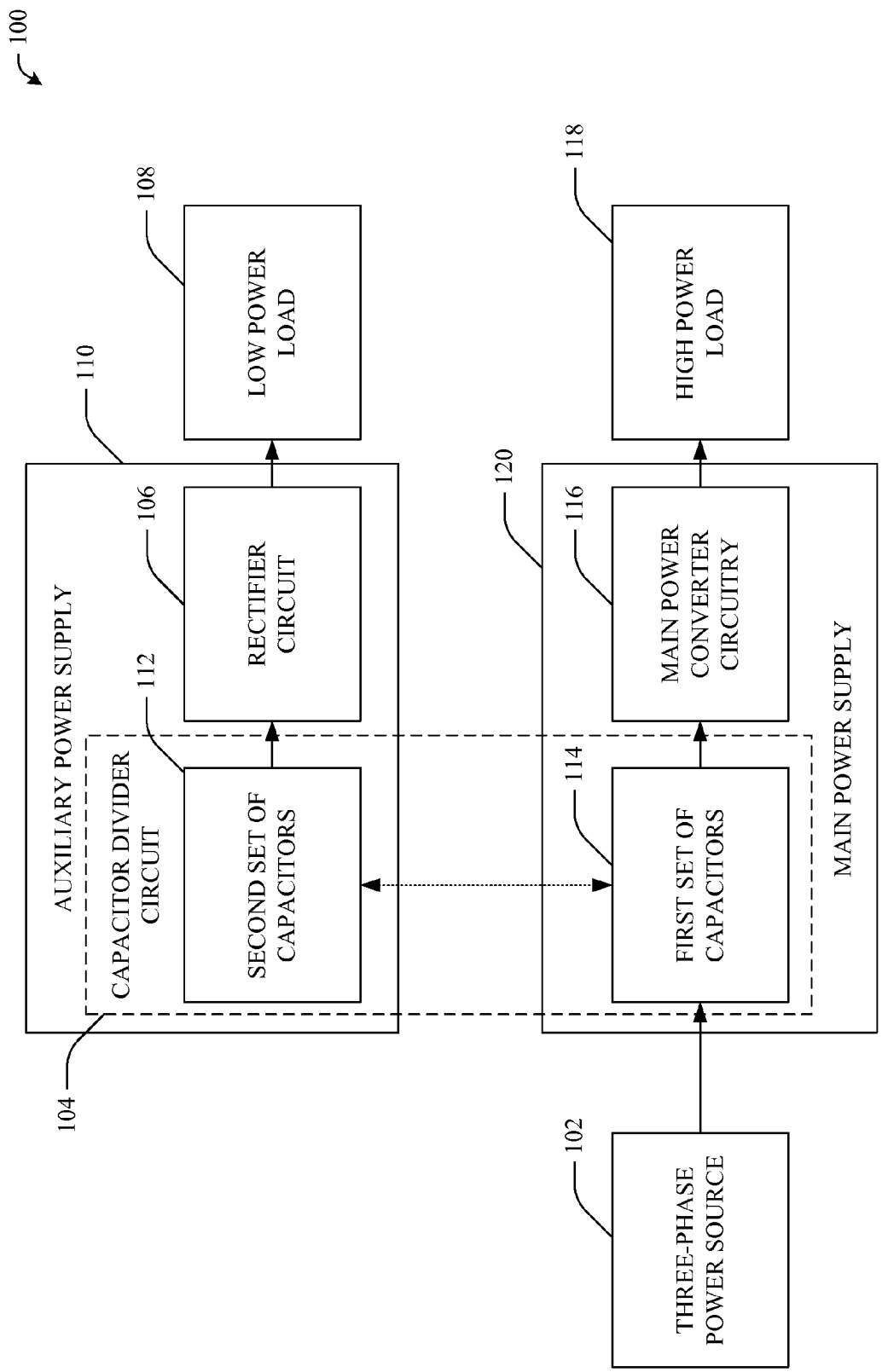
FIG. 1 illustrates a high-level functional block diagram for a cost effective and reliable auxiliary power supply.

Modern telecommunication power systems utilize power supplies to obtain the high input power necessary to operate electric loads or devices utilized in conjunction with the telecommunication power systems. In addition to the high input power, a low input power direct current (DC) signal is also desirable, for example, for controlling the semiconductor circuitry implemented inside the power supplies and loads. Typically, conventional systems utilize complex high voltage flyback converters for generating the DC signal from a three-phase alternate current (AC) power supply that provides low reliability, efficiency, and power density. The systems and methods disclosed herein eliminate the complexity of the conventional flyback converter design and utilize a simple design based on capacitor dividers for low power applications (e.g., 5-20 Watts (W)). The EMI suppression or (filtering)

capacitors that are employed within the high input power converter are leveraged in the capacitor dividers used in the auxiliary power supply.

Various aspects or features of the subject disclosure are described with reference to the drawings, wherein like reference numerals are used to refer to like elements throughout. In the subject specification, numerous specific details are set forth in order to provide a thorough understanding of the subject disclosure. It may be evident, however, that the disclosed subject matter may be practiced without these specific details, or with other methods, components, materials, etc. In other instances, well-known structures and devices are shown in block diagram form in order to facilitate describing the subject disclosure.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As used in this application, the terms "component," "system," or the like are generally intended to refer to either hardware (e.g., a circuit) or a combination of hardware and software. Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs (or uses) A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Further, the word "coupled" is used herein to mean direct or indirect electrical or mechanical coupling.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not illustrated herein. Although the embodiments disclosed herein refer in general to three-phase signals, it can be appreciated that the subject specification is not limited to a three-phase system and can be applied to a poly-phase system employing two or more phases.

Referring initially to FIG. 1, there is illustrated an example system 100 that provides a cost effective and reliable auxiliary power supply, according to an aspect of the subject disclosure. Specifically, the system 100 can be utilized to convert high voltage three-phase AC signals into a low voltage DC signal. Typically, the system 100 includes a three-phase power source 102, which can include a three-wire or four-wire power supply. In particular, the three-phase power source 102 can provide three circuit conductors (also referred to herein as lines or wires) that carry three AC signals having the same frequency but different phases. In other words, the three AC signals reach their instantaneous peak values at different times. Taking one conductor as the reference, the other two signals are delayed in time by one-third and two-thirds of one cycle of the reference signal. This delay between phases has the effect of giving constant power transfer over each cycle of the current. A four-wire power supply can include an additional neutral wire that enables the three-phase power source 102 to employ a higher voltage while still supporting lower-voltage single-phase loads. Alternatively, the three-wire power supply can be utilized for higher-voltage loads, wherein the loads can simply be connected between phases (phase-phase connection).

Typically, the three-phase power source 102 provides high voltage, for example 400-500 Volts (V), utilized by a main power supply 120 for powering various high power applications (e.g., high power load 118). In addition, the output of the three-phase power source 102 is utilized for low power applications, e.g., server board circuitry, control circuitry, etc. after conversion by the auxiliary power supply 110. According to one aspect, the auxiliary power supply 110 comprises a capacitor divider circuit 104 that divides or reduces the high voltage supplied by the three phases of the power source 102. The capacitor divider circuit 104 can include most any potential divider that employs capacitors, in series, to produce an output voltage, which is a fraction of its input voltage. The terms "voltage division" refers to the partitioning or division of the input voltage among the components of the divider. Moreover, the capacitor divider circuit 104 does not pass DC input. In one aspect, the capacitor divider circuit 104 includes a first set of capacitors 114 and a second set of capacitors 112 that form the potential divider for each phase of the three-phase power input. In one example, the first set of capacitors 114 can include filter capacitors (e.g., electromagnetic interference (EMI) capacitors) that are utilized by the main power supply 120 for filtering high frequency noise.

EMI filter/suppression capacitors are used to reduce electromagnetic interference before delivering the three-phase power to the main power converter circuitry 116. Moreover, the EMI filter/suppression capacitors are connected directly to the AC lines and are therefore exposed to overvoltages and transients, which can damage the capacitors. Therefore, in exemplary embodiments, EMI suppression capacitors are built to comply with special industry safety standards, for example, the Underwriter Laboratories (UL) standards 1414 and 1283. Leveraging the existing EMI filter capacitors of the main power supply 120 for voltage division can reduce the cost of the auxiliary power supply 110 and accordingly lower overall system costs. Although, FIG. 1 illustrates sharing of EMI capacitors by the auxiliary power supply 110 and the main power supply 120, It can be appreciated that dedicated capacitors, coupled to the three-phase power source 102, can also be utilized as a first set of capacitors in the capacitor divider circuit 104.

In one aspect, the capacitor divider circuit 104 outputs a low voltage AC signal, which is converted to a corresponding DC signal by the rectifier circuit 106. As an example, the rectifier circuit 106 can include a three-phase bridge rectifier. Moreover, the signal output by the rectifier circuit 106 has a low DC voltage that is provided to the load 108. It can be appreciated that the signal output by the rectifier circuit 106 can be regulated and/or converted to a different voltage before providing it to the load 108.

Further, it can be appreciated that the mechanical design of system 100 can include different component selections, component placements, etc., to achieve an optimal performance.

Moreover, the three-phase power source 102, capacitor divider circuit 104, rectifier circuit 106, and the load 108 can include most any electrical circuit(s) that can include components and circuitry elements of any suitable value in order to implement the embodiments of the subject innovation. Furthermore, it can be appreciated that the components of system 100 can be implemented on one or more integrated circuit (IC) chips. For example, in one embodiment, the capacitor divider circuit 104 and the rectifier circuit 106 can be implemented in a single IC chip. In other embodiments, the circuits or portions of the circuits can be fabricated on separate IC chips.

Figure 2:
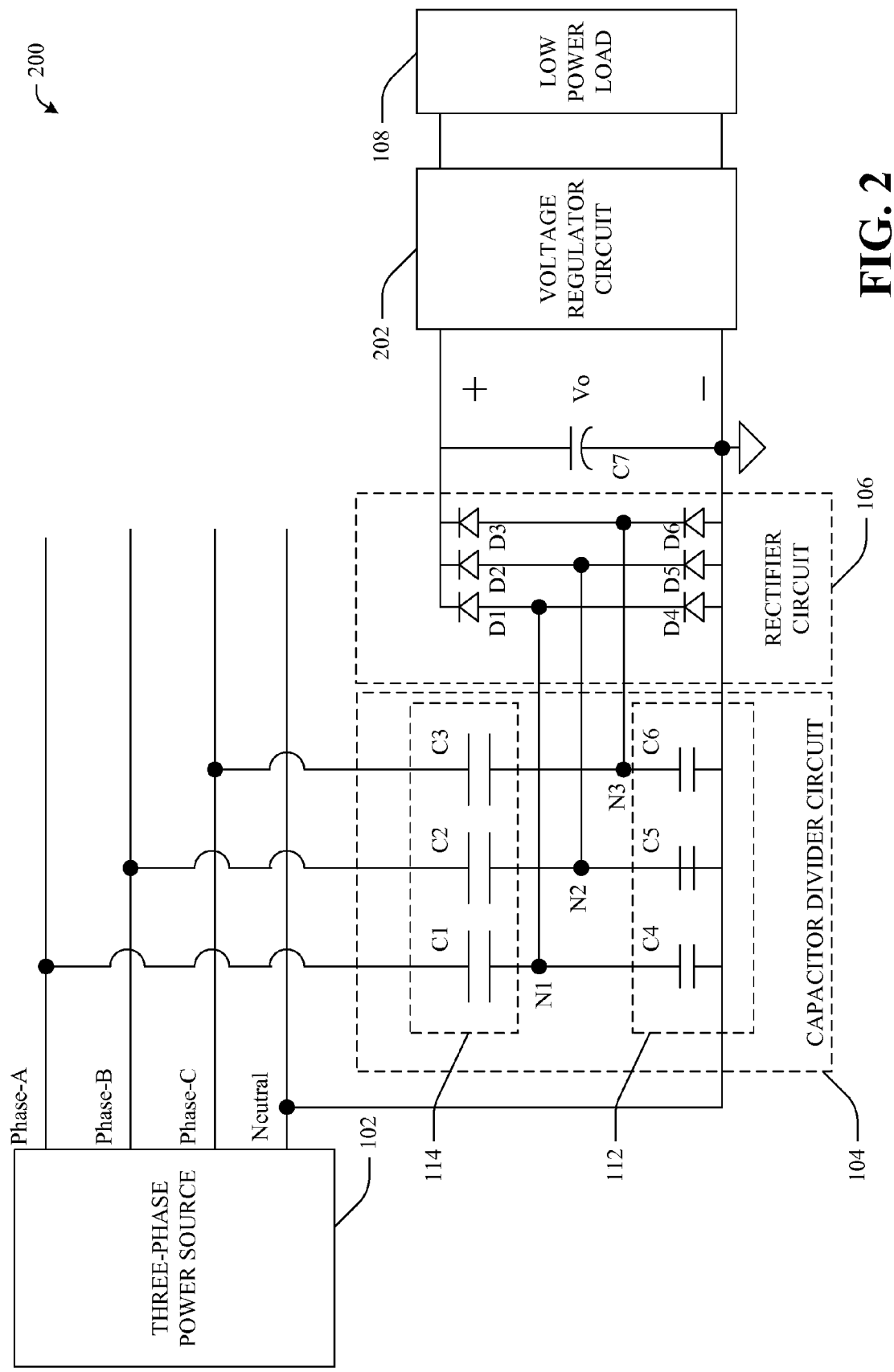
FIG. 2 illustrates an example system for generating a low voltage direct current (DC) signal from a four-wire three-phase supply.

Referring now to FIG. 2, there is illustrated an example system 200 for generating a low voltage DC signal from a four-wire three-phase supply in accordance with an embodiment. The system 200 generates a low power (e.g., 5-20 W) DC signal with output voltage, Vo, across output capacitor C7. As an example, the output DC signal can be supplied to a load, for example, via a voltage regulator circuit (e.g., linear regulator, switching regulator, etc.) 202. The voltage regulator circuit 202 can provide a constant DC output voltage and can comprise circuitry that continuously holds the output DC voltage (Vo) at a specific value regardless of changes in load current or input voltage. For example, a linear regulator comprising a zener diode, operating in its breakdown region, in parallel with resistor and capacitor can be utilized to provide a constant output voltage by adjusting a resistive voltage divider network.

According to an aspect, the three-phase power source 102 supplies a high voltage AC signal on three of the four wire conductors, namely, phase-A, phase-B, and phase-C. In addition, a neutral wire conductor is provided, which enables the system 200 to employ a higher voltage while still supporting lower voltage single phase loads. The phase-A, phase-B, and phase-C conductors provide a set of alternating electric currents, which are sinusoidal functions of time, at the same frequency, but with different phases. Typically, the phases are spaced equally, providing a phase separation of 120 degrees. The capacitor divider circuit 104 can include capacitors C1-C6 that form a voltage divider for each phase. In one example, capacitors C1, C2, and C3 can be filter capacitors implemented by the main power supply for filtering EMI noise. Typically, C1, C2, and C3 are rated at higher voltage with fewer microfarads (μF) of capacitance, as compared to capacitors C4, C5, and C6, which can be low voltage capacitors. In one aspect, the voltage on C4, C5, and C6 can be determined from capacitor divider configurations together with C1, C2, and C3. The AC signals from nodes N1-N3 are provided to the rectifier circuit 106 for conversion to a DC output signal with voltage V0 (e.g., 5-20 Volts (V)).

System 200 facilitates generation of controlled power with a low DC voltage from a high voltage three-phase input. There are several advantages of utilizing the three-phase input. For example, if input from only one of the phases (e.g., phase-A, phase-B, or phase-C) is utilized, an imbalance will be created between the phases. Thus to balance the AC line in current, a three-phase input is employed. In addition, the three-phase input offers a very low output voltage ripple at Vo. Typically, the three-phase input voltage is high, for example, around 450-500 V and converting this voltage directly to DC would provide a very high DC voltage. In contrast, system 200 provides a low-cost system that provides a controlled power output with low DC voltage. Referring back to FIG. 2, in one example, capacitors C1-C3 can be rated for high voltage (e.g., 300-500 V) and have a capacitance of 1-5 μF, whereas the capacitance of C4-C6 can typically be 10-100 times higher than the capacitance of C1-C3, for example 10-500 μF. Further, capacitors C4-C6 can have lower voltage ratings (e.g., 10-20V) compared to the capacitors C1-C3. In one example, system costs can be significantly lowered by employing existing EMI filter capacitors of the main power supply as capacitors C1-C3 and low-cost capacitors for capacitors C1-C3 (since a low voltage rating is sufficient for operation).

The capacitor divider circuit 104 outputs a low voltage AC signal (e.g., 10-20 V) at nodes N1-N3. In one aspect, the rectifier circuit 106 converts the low voltage signal at nodes N1-N3 to a low voltage DC signal (Vo). Typically, the rectifier circuit 106 includes a three-phase bridge rectifier comprising diodes D1-D6. Moreover, each node N1-N3 connects between a pair of diodes: one to route power to the positive side of the load, and the other to route power to the negative side of the load. When the signals from the nodes N1-N3 are rectified, the phase-shifted pulses overlap each other to produce a DC output (Vo) that is much "smoother" (has less AC content) than that produced by the rectification of single-phase AC. Although a full wave rectifier is illustrated, it can be appreciated that the rectifier circuit 106 can include a half wave rectifier. In addition, the rectifier circuit 106 can comprise most any electrical circuit or element; for example, silicon controlled rectifiers (SCR) can be utilized instead of the diodes D1-D6. Additionally or optionally, a regulator, for example, a linear regulator or switching regulator, can be connected to the output of the rectifier circuit 106 to regulate voltage Vo.

Figure 3:
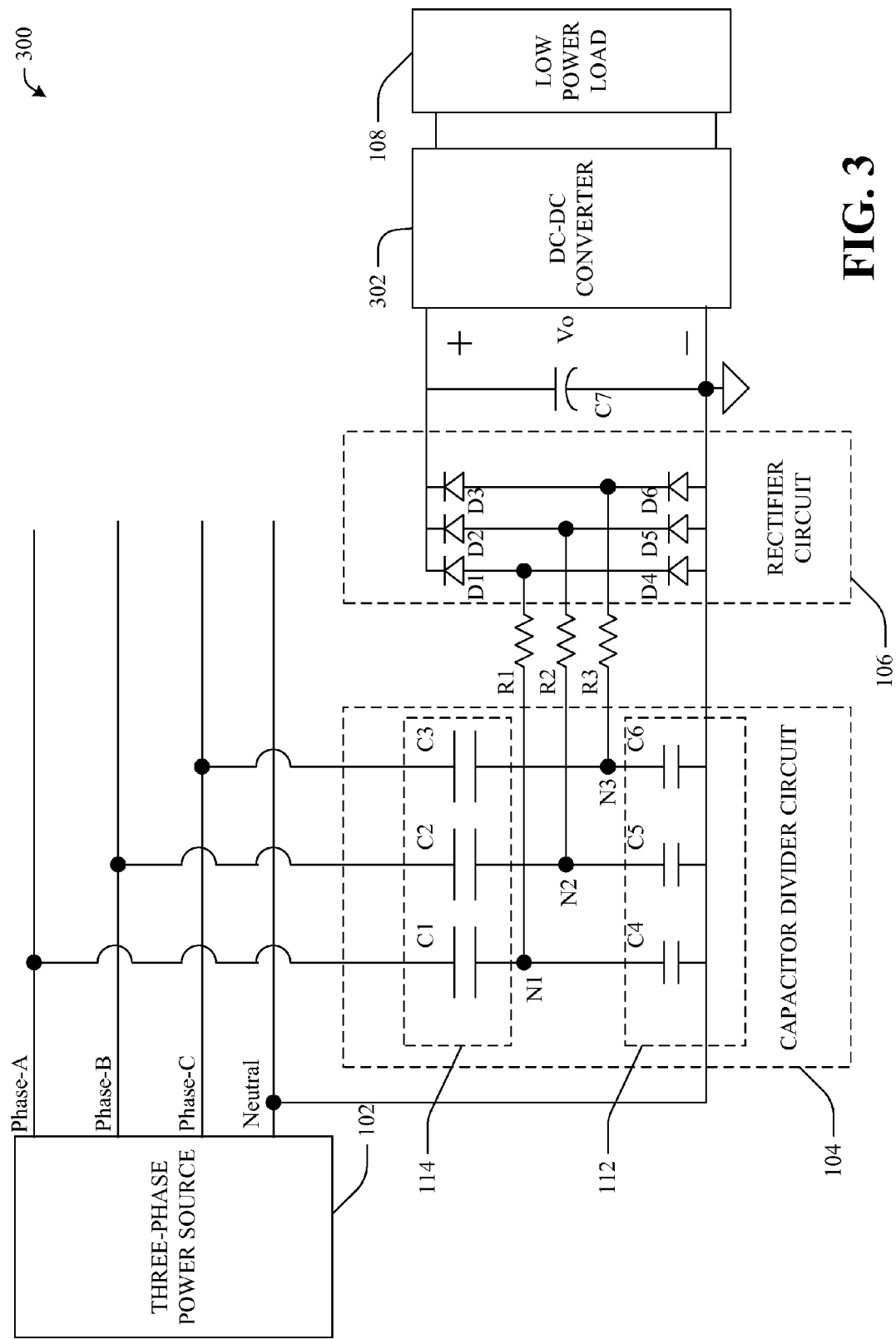
FIG. 3 illustrates an example system that reduces electromagnetic interference (EMI) noise in an auxiliary power supply.

Referring now to FIG. 3, there is illustrated an example system 300 that reduces EMI noise in an auxiliary power supply, according to an aspect of the subject disclosure. Typically, the three-phase power source 102, the capacitor divider circuit 104 and the rectifier circuit 106 can include functionality, as more fully described herein, for example, with regard to systems 100-200. EMI noise can be generated by various sources, such as, but not limited to, switching integrated circuits, power supplies and/or regulators. Whether on the power and ground planes or on the signal lines themselves, this interference can substantially interrupt, obstruct, degrade or limit the effective performance of the system. In one aspect, C1-C3 can include EMI filter capacitors utilized for filtering EMI noise in a main power supply. In addition to the EMI noise in the main power supply, EMI noise is also generated in the auxiliary power supply, for example, by the rectifier circuit 106 and/or capacitor C7.

According to an embodiment, resistors R1, R2 and R3 resistors can be added in series with the rectifier circuit 106 in order to improve EMI performance by reducing a rapid/sudden current variation (e.g., spike in current) in the capacitors C1, C2 and C3. In one aspect, the resistance of the resistors R1-R3 can be specified based on power consumption limits for a specific application. For example, resistors R1-R3 can provide a small amount of resistance (e.g., 5-50 Ohms), such that power consumption is low. Moreover, resistors R1-R3 can reduce the variation in current at nodes N1-N3 respectively and significantly lower the EMI noise produced by the system 300. Typically, system 300 can be utilized in applications that are less tolerant to EMI noise, while system 200 can be utilized in applications that are more tolerant to EMI noise. Addition of resistors R1-R3 in system 300 slows down current variation in the current flowing between the capacitor divider circuit 104 and the rectifier circuit 106, and accordingly improves EMI filtering. As noted supra, the output (Vo) of the rectifier circuit 106 can be regulated by utilizing a voltage regulator (shown in FIG. 2). Further, a step-down (or step-up) DC-DC converter 302 can be utilized to change the output voltage (Vo). Moreover, system 300 can provide a simplistic and cost effective three-phase auxiliary power supply, without providing isolation, for example, by employing a magnetic transformer.

Figure 4A:
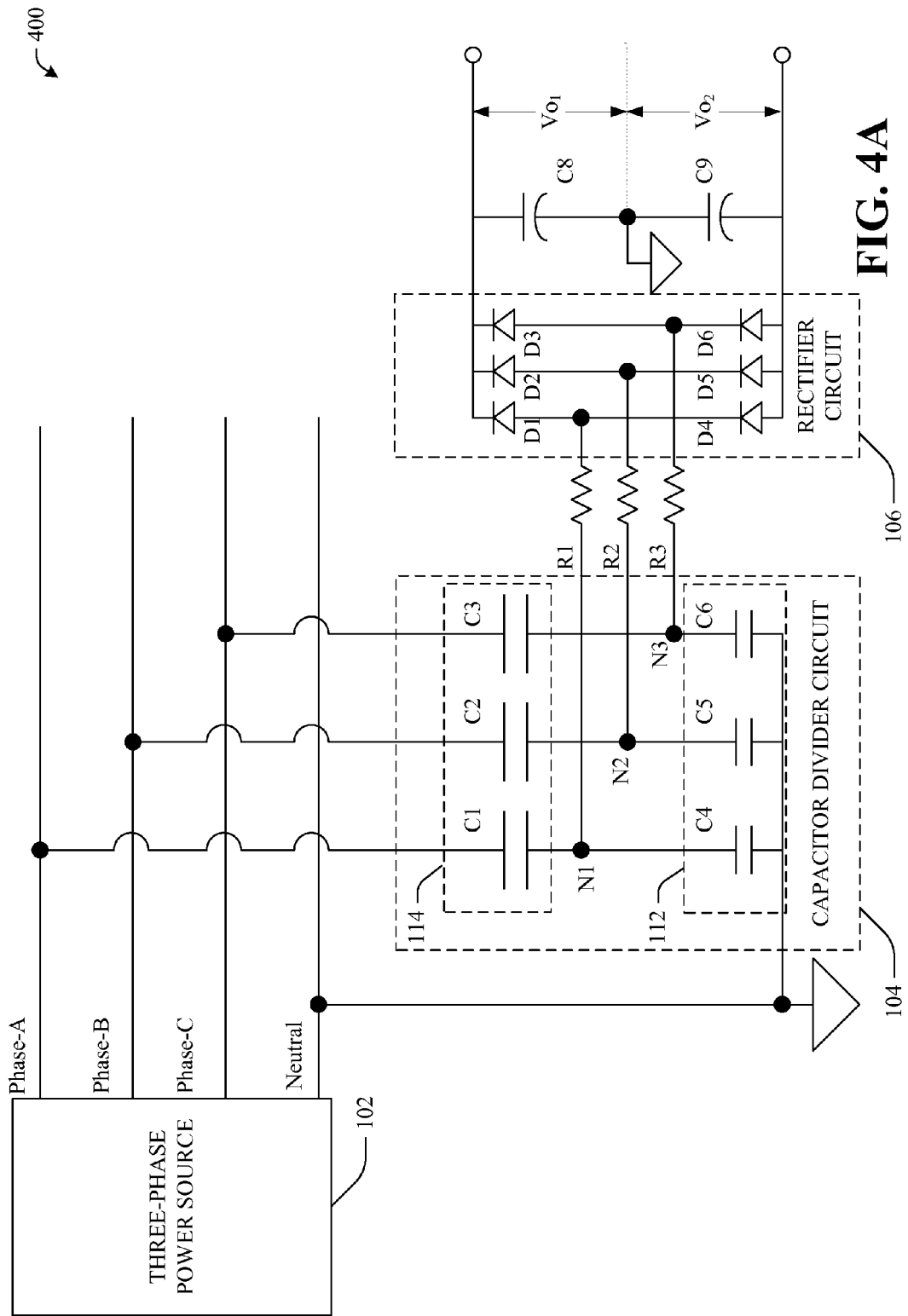
FIGS. 4A-B illustrate example implementations of an auxiliary power supply that provides two output voltages.
Figure 4B:
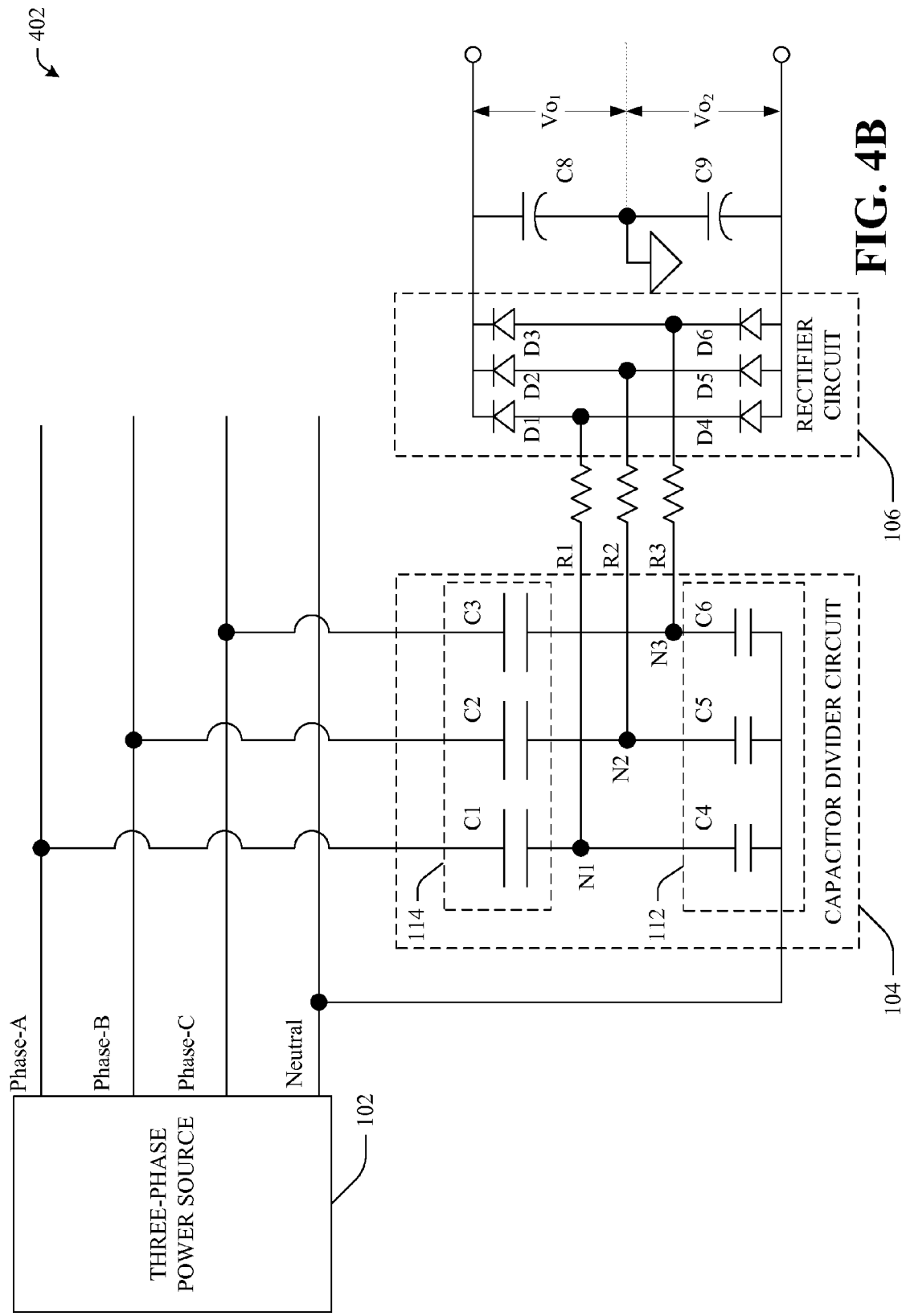

FIGS. 4A-B illustrates another example system 400 for implementing a three-phase auxiliary power supply that provides two output voltages in accordance with an aspect of the specification. Systems 400 and 402 are substantially similar to system 300, described above, except that in systems 400-402, two capacitors C8 and C9 are coupled to the output of the rectifier circuit 106. In the example systems 400 and 402, two voltage signals, $Vo_1$ and $Vo_2$, can be generated by the auxiliary power supply. For example a positive and negative voltage can be generated. It can be appreciated that $Vo_1$ and $Vo_2$, can have the same magnitude or different magnitudes based on the value of the capacitance of capacitors C8 and C9. In addition, although resistors R1-R3 are depicted in FIGS. 4A-B, it can be appreciated that the systems 400-402 can be implemented without resistors R1-R3, such that the nodes N1-N3 are directly connected to the input of the rectifier circuit 106. Specifically, systems 400 and 402 are substantially similar except for the ground (GND) potential of the Neutral line. System 400 comprises a circuit with the Neutral line having a GND potential, whereas system 502 comprises a circuit wherein the Neutral line is separate from GND.

Figure 5:
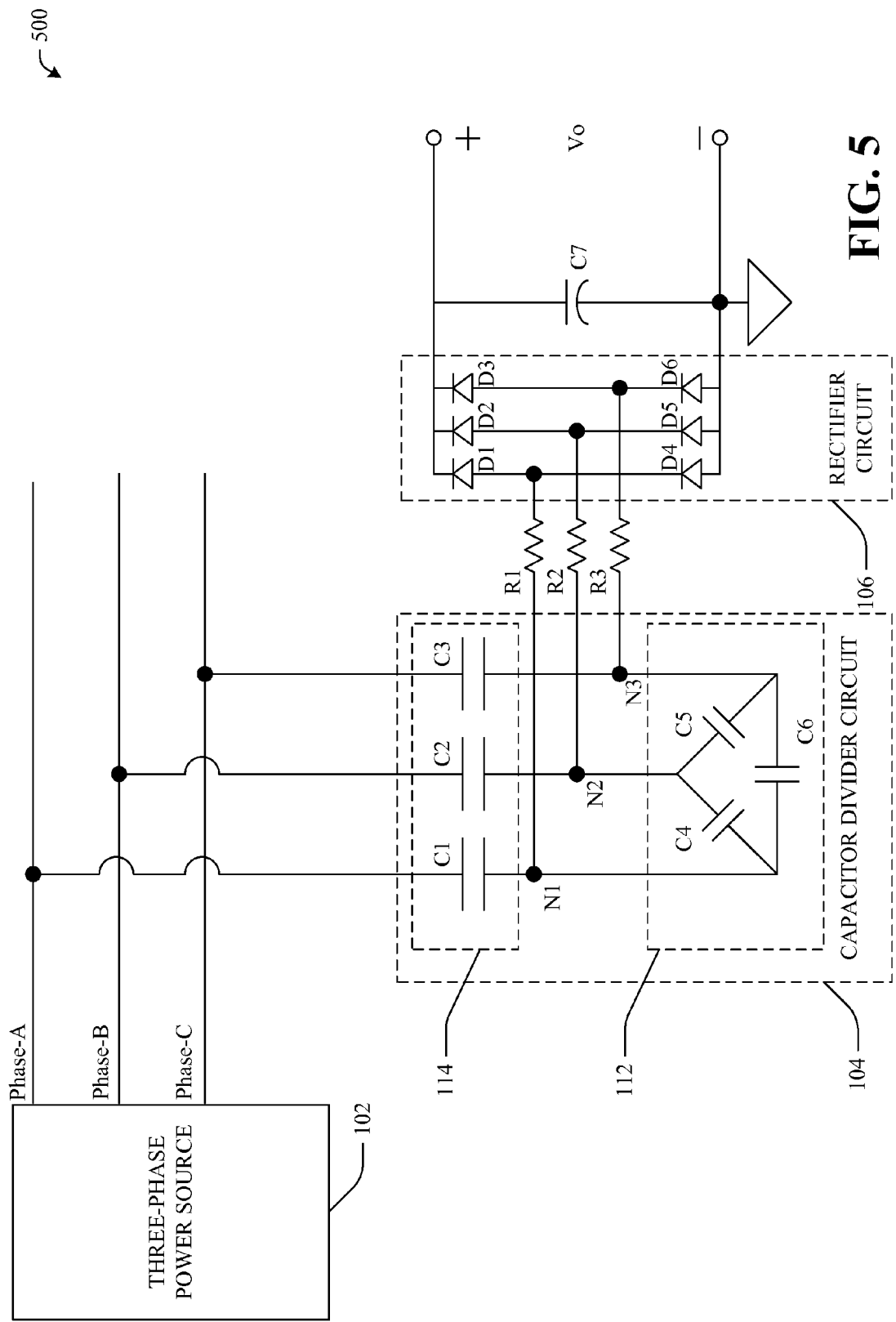
FIG. 5 illustrates another example implementation of an efficient auxiliary power supply that provides a low voltage auxiliary signal generated from a three-phase three-wire power source.

Referring to FIG. 5, there illustrated is yet another example low cost system 500 for providing a low voltage auxiliary signal generated from a three-phase power source in accordance with an aspect of the subject system. Typically, system 500 can be utilized for various applications, for example, power supplies, server boards, etc. System 500 includes a three-wire three-phase power source 102 that provides three conductors for transferring phase shifted AC signals. In contrast with systems 200-400, system 500 does not include a neutral wire. Typically, in the three-wire three-phase system 500, the load(s) are distributed between each pair of phases, whereas in the four-wire three-phase systems 200, 300 and 400, the loads are distributed between each phase and the neutral phase.

In one embodiment, the three phases (phase-A, phase-B, and phase-C) are coupled to a capacitor divider circuit 104 that implements a set of capacitors (C4-C6) in a delta configuration. Moreover, the capacitors are connected in a line-to-line connection instead of line-to-neutral connection. For example, capacitors C1, C4, and C2 are connected between the phase-A and the phase-B lines; capacitors C1, C6, and C3 are connected between the phase-A and the phase-C lines; and capacitors C2, C5, and C3 are connected between the phase-B and the phase-C lines. Typically, capacitors C1-C3 can be EMI filter capacitors utilized to reduce differential mode noise in a power converter. Moreover, the capacitor divider circuit 104 can reduce the high voltage AC signals from the three-phase power source 102 to low voltage AC signals and deliver the low voltage AC signals to the rectifier circuit 106, which in turn can generate a low voltage DC output signal (Vo). Although resistors R1-R3 are depicted in FIG. 5, it can be appreciated that the system 500 can be implemented without resistors R1-R3. In addition, although FIG. 5 depicts a single voltage (Vo) output by the rectifier circuit 106, system 500 can employ two capacitors at the output of the rectifier circuit 106 to generate two output voltages (as illustrated in system 400).

Figure 6:
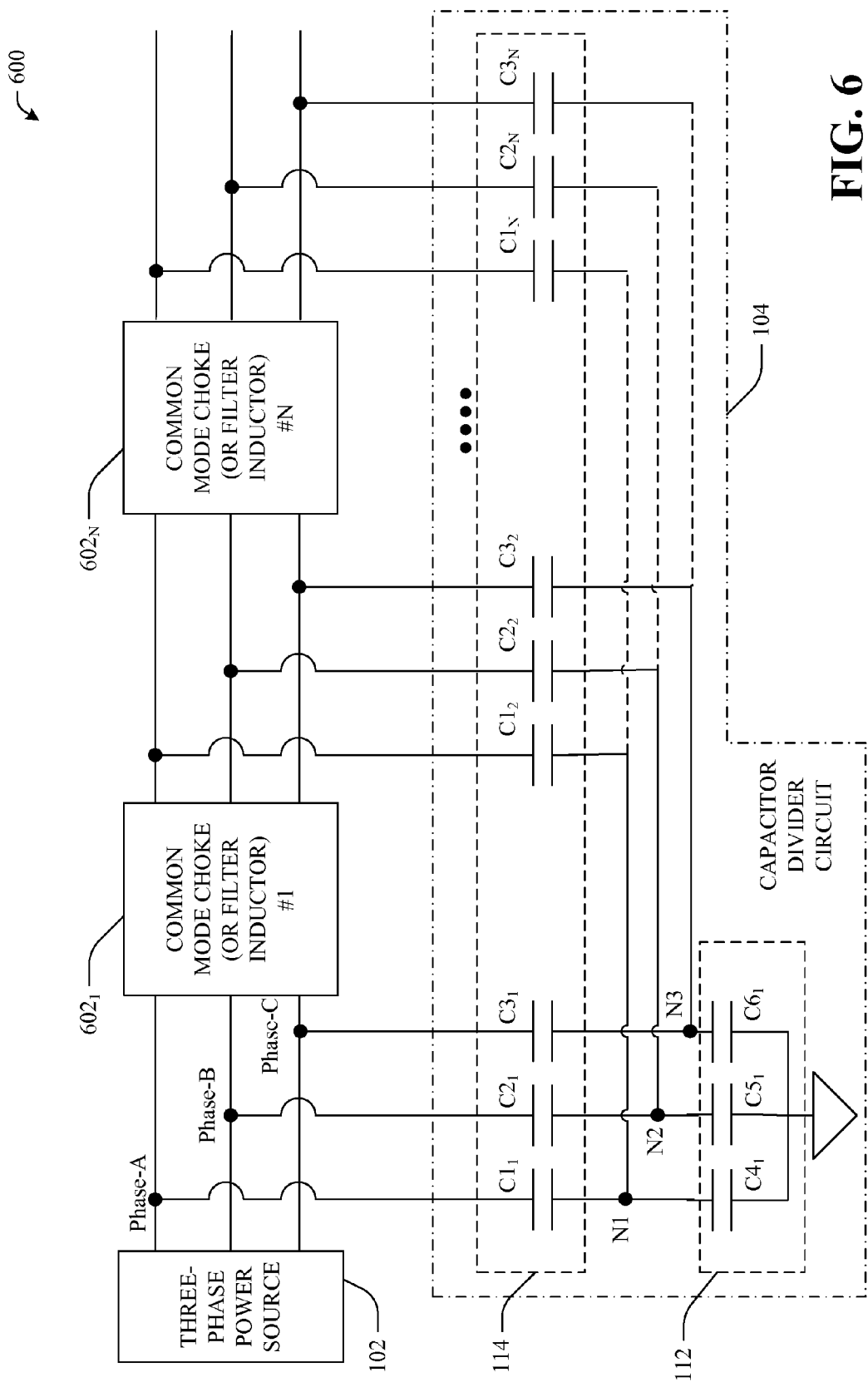
FIG. 6 illustrates an example system that leverages EMI filter capacitors to generate controlled auxiliary power.

Referring now to FIG. 6, there illustrated is an example system 600 that leverages EMI filter capacitors to generate auxiliary power, according to an aspect of the subject disclosure. In particular, system 600 includes an N-stage EMI filter for reducing and/or eliminating EMI noise (where N is an integer). The EMI filter includes a set of common mode chokes $602_1$-$602_N$ that are employed to reduce common mode noise. In one example, differential mode filter inductors can also be utilized instead of common mode chokes. Moreover, the common mode chokes $602_1$-$602_N$ can be used to significantly block the unwanted EMI noise signal (at the load) without a causing significant reduction in the desired signal. The common mode chokes $602_1$-$602_N$ are connected between the respective capacitor pairs. For example, common mode choke $602_1$ is connected between capacitors $C1_1$ and $C1_2$, capacitors $C2_1$ and $C2_2$, and capacitors $C3_1$ and $C3_2$. Similarly, multiple stages of common mode chokes can be connected, such as, common mode choke $602_N$ that is connected between capacitors $C1_{N-1}$ and $C1_N$, capacitors $C2_{N-1}$ and $C2_N$, and capacitors $C3_{N-1}$ and $C3_N$. According to an aspect, these existing capacitors $C1_1$-$C1_N$, $C2_1$-$C2_N$, and $C3_1$-$C3_N$, that are utilized to filter EMI noise in a main power supply, can be utilized to implement an auxiliary power supply that provides a low voltage DC signal (e.g., utilized by control circuitry of the main power supply). In one embodiment, capacitors $C4_1$, $C5_1$, and $C6_1$ can be added to form a capacitor divider circuit. Moreover, the capacitors $C4_1$, $C5_1$, and $C6_1$ can be connected to a common line, for example, the neutral line or ground. As discussed previously, the signals from nodes N1-N3 are provided to a rectifier circuit (e.g., via resistors R1-R3), which converts the low voltage AC signals to a low voltage DC signal.

It can be appreciated that the capacitors C1-C9, $C1_1$-$C1_N$, $C2_1$-$C2_N$, $C3_1$-$C3_N$, $C4_1$, $C5_1$, and $C6_1$ in systems 200-600 can have suitable capacitance values (or ratios) depending on the application. In addition, resistors R1-R3 utilized in systems 300-500, can have suitable resistance values or ratios depending on the application.

Figure 7A:
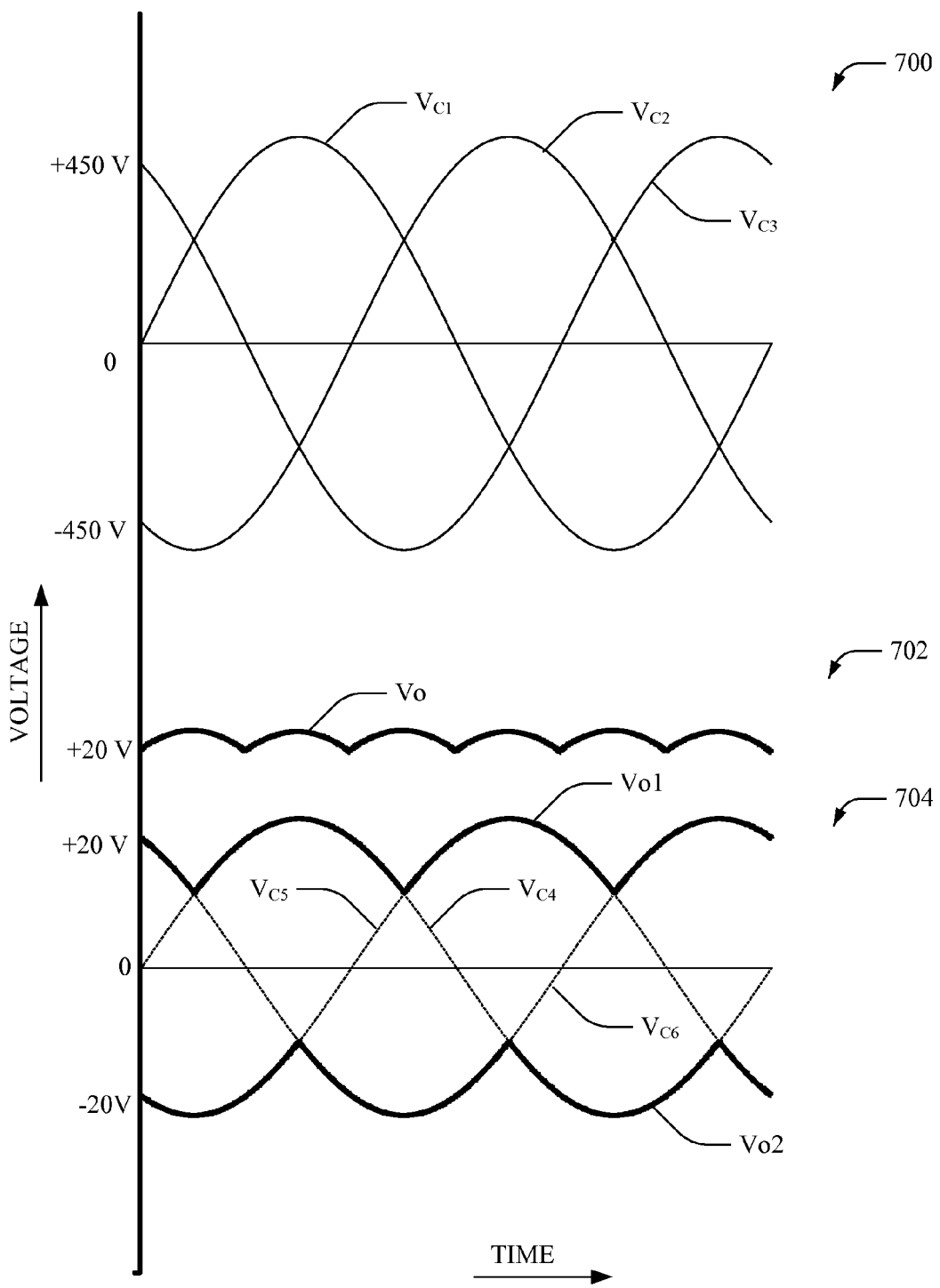
FIGS. 7A and 7B illustrates example waveforms that depict voltages at various nodes in an auxiliary power generation system; and, FIG. 8 illustrates an example methodology for generating a low power auxiliary signal in a three-phase power supply.
Figure 7B:
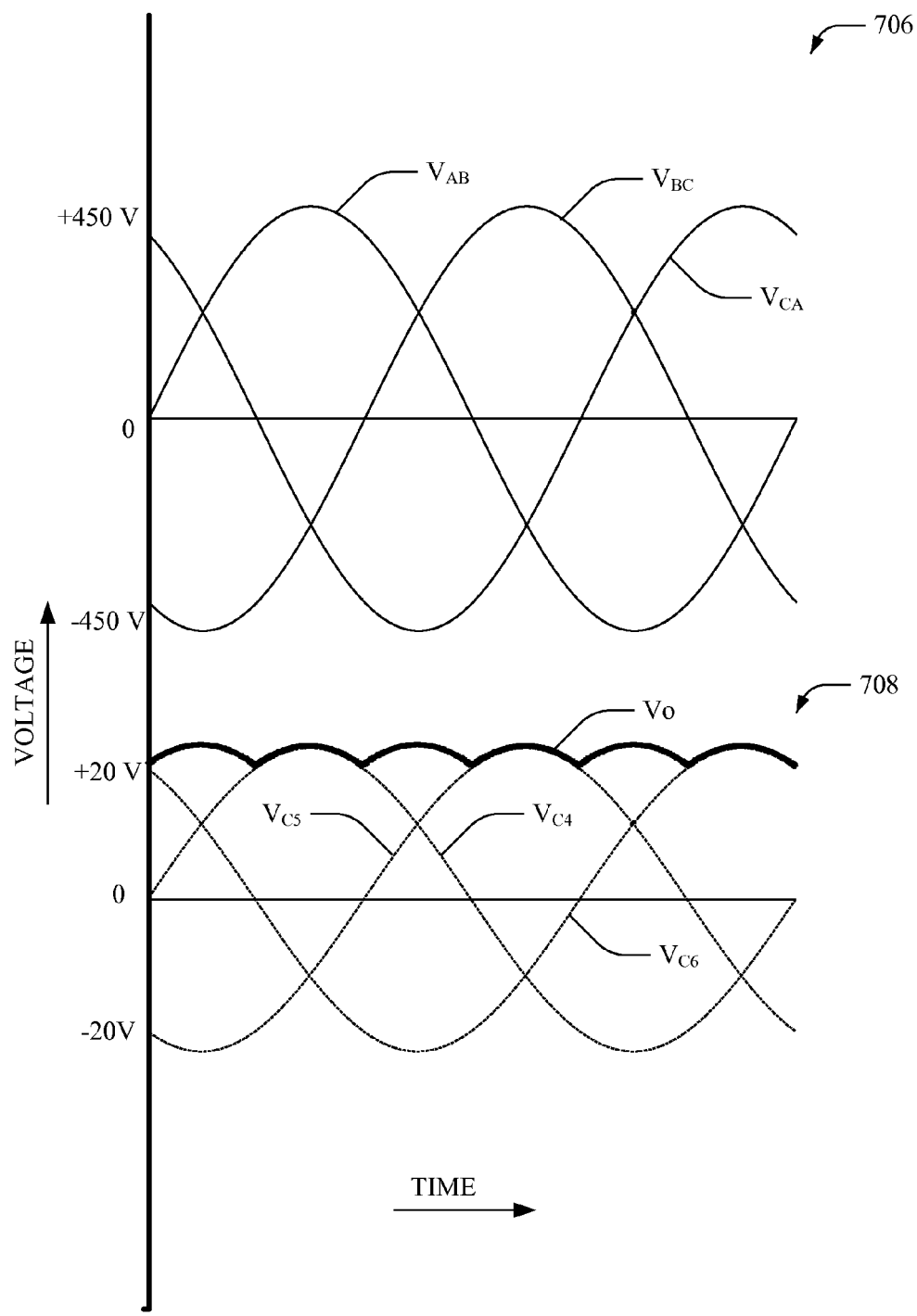

FIGS. 7A and 7B illustrate example waveforms 700-708 at various nodes in systems 200, 300, 402 and 500 in accordance with an aspect of the subject disclosure. Specifically, FIG. 7A depicts voltage signals in a four-wire three-phase system, such as, systems 200, 300, and 402, whereas FIG. 7B depicts voltage signals in a three-wire three-phase system, such as, system 500. Moreover, waveform 700 depicts the voltages, $V_{C1}$, $V_{C2}$, and $V_{C3}$, across capacitors C1, C2, and C3 respectively, over time. Specifically, the voltages $V_{C1}$, $V_{C2}$, and $V_{C3}$ have the same frequency but are phase shifted by 120 degrees. In one example, the maximum/peak voltage can be 450 V. In other examples, the maximum/peak voltage can be much higher than 450V. In one example, the maximum/peak voltage can be 450V. Further, the voltages $V_{C4}$, $V_{C5}$, and $V_{C6}$, across capacitors C4, C5, and C6 respectively are depicted with dotted lines in waveform 704.

At 702, single voltage output (Vo) across capacitor C7 of systems 200 and 300 is illustrated, while at 704, dual voltage outputs ($Vo_1$ and $Vo_2$) across capacitors C8 and C9 of system 402 is illustrated. As an example, the capacitor divider circuit 104, reduces the input voltage, for example to 20V (or ±20V), as seen from waveform 702 (or 704). As seen in 702 and/or 704, a very low output voltage ripple is obtained from the three-phase inputs. Typically, the output ripple voltage shows six times the line frequency.

Referring now to FIG. 7B, there illustrated are example voltage signals at various nodes within system 500. As an example, waveform 706 depicts voltages between the three phases ($V_{AB}$, $V_{BC}$, and $V_{AC}$). In one aspect, voltages $V_{C4}$, $V_{C5}$, and $V_{C6}$, across capacitors C4, C5, and C6 respectively are depicted with dotted lines in waveform 708. In addition the low ripple output voltage V0 obtained by rectifying (e.g., by rectifier circuit 106) the voltages $V_{C4}$, $V_{C5}$, and $V_{C6}$ is also depicted in waveform 708.

Figure 8:
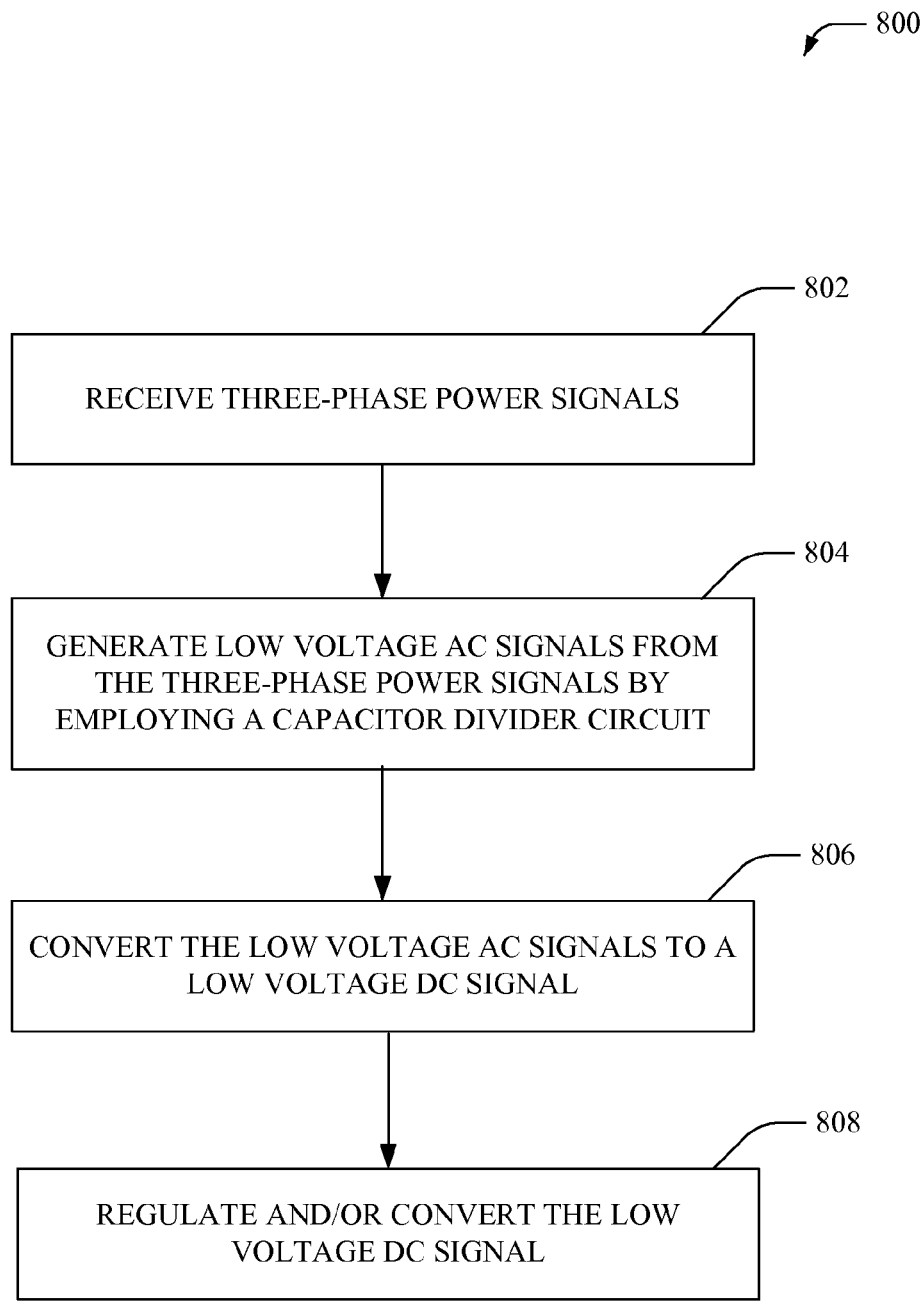

FIG. 8 illustrates a methodology in accordance with the disclosed subject matter. For simplicity of explanation, the methodology is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodology in accordance with the disclosed subject matter. In addition, those skilled in the art will understand and appreciate that the methodology can alternatively be represented as a series of interrelated states via a state diagram or events.

Referring to FIG. 8, there illustrated is a methodology 800 for generating a low power auxiliary signal in a three-phase power supply, according to an aspect of the subject innovation. As an example, methodology 800 can be utilized in various applications, such as, but not limited to, distributed power systems, high availability servers, telecommunication power systems, powered insertion boards, etc. Typically, the main three-phase power supply provides high voltage (e.g., 400-500V) on each phase; however, a low voltage DC signal is required, for example, to operate control circuits within the main three-phase power supply. Accordingly, methodology 800 generates a low voltage DC signal by employing a three-phase input.

Initially at 802, three-phase power signals are received. Typically the three-phases provide high voltage AC signals that are phase-shifted by 120 degrees. At 804, low voltage AC signals can be generated from the three-phase power signals by employing a capacitor divider circuit. Moreover, the voltage of the three-phase power signals is reduced, based on charging of the capacitors in the capacitor divider circuit, to generate a low voltage AC signal (e.g., 20 V AC signal). As an example, EMI filter capacitors, utilized in the main three-phase power supply for controlling EMI noise, can be leveraged to form the capacitor divider. Further, at 806, the low voltage AC signal can be converted into a low voltage DC signal (e.g., 20 V DC signal), for example, by utilizing a bridge rectifier. In one aspect, EMI noise generated during conversion can be reduced by employing low resistance resistors between the capacitor divider and the bridge rectifier. Moreover, the low voltage DC signal can be provided to operate control circuitry within the main three-phase power supply. Additionally or optionally, at 808 the low voltage DC signal can be regulated (e.g., by employing a linear or switching regulator) and/or converted to different DC voltages (e.g., by employing a DC-DC converter) before being provided to the control circuitry.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. The aforementioned systems, devices, and circuits have been described with respect to interaction between several components and/or blocks. It can be appreciated that such systems, devices, circuits, and components and/or blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A power supply, comprising:
   a three-phase power source configured to provide three alternating current (AC) voltage signals;
   a capacitor divider circuit, coupled to the three-phase power source, configured to generate three disparate AC voltage signals, wherein an amplitude of the three AC voltage signals is higher than an amplitude of the three disparate AC voltage signals, and wherein the capacitor divider circuit includes a pair of capacitors coupled between a first output line of the three-phase power source and at least one of a neutral line or a second output line of the three-phase power source;

a main power supply coupled to the three-phase power source and including a first set of capacitors configured to reduce electromagnetic interference (EMI) noise; and an auxiliary power supply including a second set capacitors, wherein, the pair of capacitors of the capacitor divider circuit includes one capacitor from the first set of capacitors coupled in series with one capacitor from the second set of capacitors, wherein the capacitor divider circuit is configured to decrease the voltage level of a three-phase alternating current (AC) power waveform provided by the three-phase power source.

2. The power supply of claim 1, further comprising: a rectifier circuit configured to convert the three disparate AC voltage signals into a direct current (DC) voltage signal.

3. The power supply of claim 2, wherein the rectifier circuit comprises a three-phase bridge rectifier.

4. The power supply of claim 2, further comprising: a resistor, coupled in series between the capacitor divider circuit and the rectifier circuit, and configured to reduce a spike in a current provided by the capacitor divider circuit.

5. The power supply of claim 2, further comprising: two capacitors coupled to an output of the rectifier circuit, wherein the capacitors are configured to provide a positive output voltage and a negative output voltage respectively.

6. The power supply of claim 1, wherein the three-phase power source includes a four-wire configuration comprising the neutral line.

7. The power supply of claim 6, wherein a plurality of the capacitors within the capacitor divider circuit are coupled in a star configuration.

8. The power supply of claim 1, wherein the three-phase power source includes a three-wire configuration.

9. The power supply of claim 8, wherein a plurality of the capacitors within the capacitor divider circuit are coupled in a delta connection.

10. The power supply of claim 1, wherein the capacitor divider circuit includes at least one capacitor utilized for filtering electromagnetic interference (EMI) noise in a power converter coupled to the three-phase power source.

11. The power supply of claim 1, wherein the capacitor divider circuit includes a plurality of capacitors coupled in parallel across at least one of a common mode choke or a differential mode filter inductor.

12. The power supply of claim 1, further comprising: a rectifier configured to generate a direct current (DC) output signal based on a conversion of an output of the capacitor divider.

13. The power supply of claim 12, wherein the rectifier is coupled to a load via at least one of a voltage regulator or a DC-DC converter.

14. The power supply of claim 1, wherein the three-phase power source provides a three-phase AC power waveform on three conductors, and wherein the first set of capacitors includes three capacitors that are coupled to the three conductors respectively.

15. The power supply of claim 1, wherein the second set of capacitors have a higher capacitance value than the first set of capacitors.

16. The power supply of claim 1, wherein the second set of capacitors have a lower voltage rating than the first set of capacitors.

17. A method, comprising:
receiving a first three-phase alternating current (AC) voltage waveform;
using a first set of capacitors implemented in a main power supply to reduce electromagnetic interference (EMI) noise; and
generating a second three-phase AC voltage waveform comprising a smaller voltage amplitude than the first three-phase AC voltage waveform by using a pair of capacitors coupled in a capacitor divider configuration, wherein the pair of capacitors comprises one capacitor from the first set of capacitors coupled in series with one capacitor from a second set of capacitors implemented in an auxiliary power supply.

18. The method of claim 17, further comprising: converting the second three-phase AC voltage waveform into a direct current (DC) voltage waveform.

19. The method of claim 17, further comprising: reducing a rate of change in current associated with the second three-phase AC voltage waveform.

20. The method of claim 17, further comprising: converting the second three-phase AC voltage waveform into a positive DC voltage and a negative DC voltage.

* * * * *